C. P. SPECK.
CONFECTION MOLD.
APPLICATION FILED JUNE 21, 1921.
1,421,601.
Patented July 4, 1922.
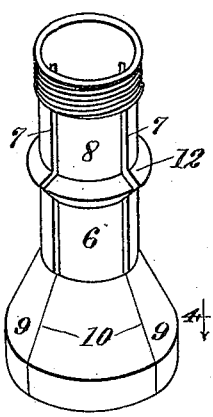
Fig.1.
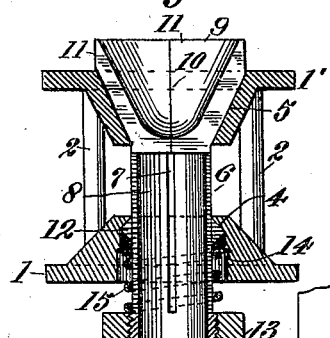
Fig.2.
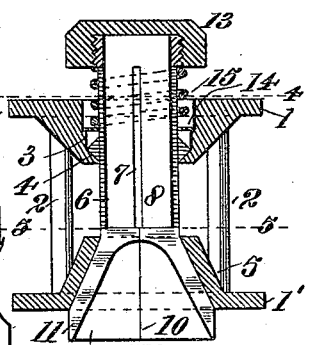
Fig.3.
Fig.4.
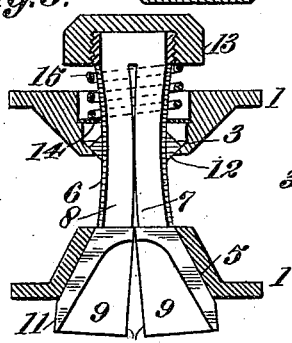
Fig.6.
Fig.5.
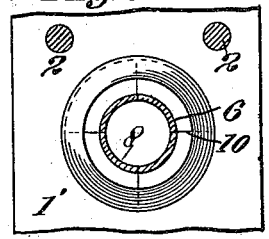
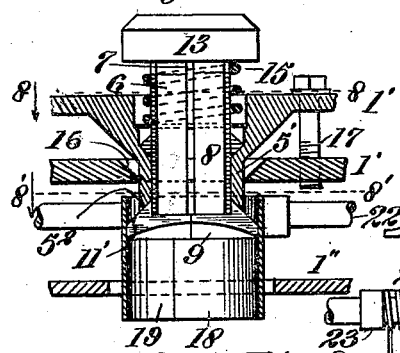
Fig.7.
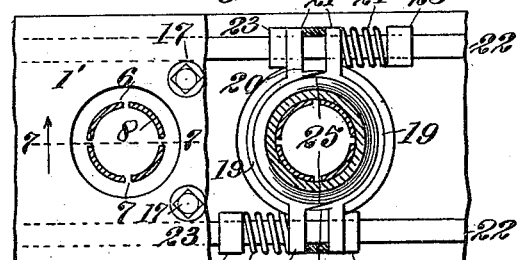
Fig.8.
Fig.9.
Inventor.
C. P. Speck.
By Acker & Totten,
Attorneys

UNITED STATES PATENT OFFICE.

CLIFFORD P. SPECK, OF OAKLAND, CALIFORNIA.

CONFECTION MOLD.

1,421,601.  Specification of Letters Patent.  Patented July 4, 1922.

Application filed June 21, 1921. Serial No. 479,208.

*To all whom it may concern:*

Be it known that I, CLIFFORD P. SPECK, a citizen of the United States, residing at Oakland, in the county of Alameda and State of California, have invented certain new and useful Improvements in Confection Molds, of which the following is a specification.

The present invention relates to a mold particularly adapted for use in confection making machines, of that type set forth in my co-pending application Serial No. 381,849, filed in the United States Patent Office on the 17th day of May, 1920.

By the present invention, I provide a mold adapted for use in the forming of either shells for filled goods, or in the formation of solid goods, or hollow goods, and whereby certain shapes of goods are capable of being made in various sizes and configurations.

Among the objects of my invention is the provision of a mold structure wherein the mold walls are separated or broken from the molded form, and thereby releasing the form from the mold without injuring the surface thereof.

Another advantage is in the simplicity of construction of the mold, and when used for the manufacture of goods of different sizes in the ease of adjustment of the mold from one size to another.

A further object is in the provision of a guide opening with which the mold co-operates whereby on the mold assuming its normal position, the mold section side walls are at all times in contact to insure the formation of a perfect article.

With the above mentioned and other objects in view, the invention consists in the novel construction and combination of parts hereinafter described, illustrated in the accompanying drawings, and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein:—

Figure 1 is a view in perspective of one of the molds removed from its guide, and with its head detached therefrom.

Figure 2 is a vertical sectional view of a mold in closed position in its carrier with the mold chamber inverted and in its position to receive a deposit of material.

Figure 3 is a view similar to Figure 2 with the mold in a position to be opened and discharge its formed article.

Figure 4 is a sectional view on line 4—4 of Figure 3 illustrating two of the molds associated with a carrier.

Figure 5 is a sectional view taken on line 5—5 of Figure 3.

Figure 6 is a view of the mold in Figure 3 in open position discharging its formed article.

Figure 7 is a view of a modified form of construction disclosing the adjustable shell or skirt enabling configurations of various sizes to be formed.

Figure 8 is a view of a carrier disclosing two molds in horizontal section, one on line 8—8 of Figure 7, the other on line 8'—8' of Figure 7.

Figure 9 is a view in side elevation of the expanding means for a shell or skirt.

Referring more particularly to the several views of the drawings wherein like characters of reference designate corresponding parts, and particularly to Figures 1 to 6 inclusive, the numerals 1 and 1' indicate the upper and lower plates of a carrier connected by studs or posts 2. In a completed apparatus, there are preferably a number of the carriers in parralel relation and flexibly connected at opposite ends, as in my herein mentioned co-pending application, and each carrier is adapted to mount in alignment therein a plurality of molds, hereinafter described.

The plates 1 and 1' throughout their length are formed with aligned guide openings, those of the upper plate each being formed within their depth with an annular flange 3, and at their lower ends with the annular inwardly and downwardly beveled guiding shoulders 4. The lower plates 1' in alignment with the openings in the upper plates are formed with suitable guide openings simulating an inverted cone with its annular wall 5 disposed upwardly and inwardly when the plates are in a position for the mold to discharge its contents. Mounted for longitudinal reciprocation within each pair of guide openings in the plates 1 and 1' is a tubular stem 6 longitudinally slotted as at 7 from a point at one end to a point falling short of its other end providing spaced cup supporting portions 8. Each portion 8 mounts on its lower end a segmental section 9, said sections being illustrated as four in number, and having parallel meeting side walls or edges 10, and said sections are adapted to form a cup or mold 11 having a conical depression, within which the material to be molded is received. The outer wall surface of the cup or mold section forming members is inclined or beveled to co-operate with the wall 5 of the guide in the lower plate 1', as in Figures 2 and 3 of the drawings, so that when in normal position with the outer surface of the mold forming sections in full contact with the surface 5, the meeting edges 10 of the mold forming sections will lie in full contact. Within its length, and at a point between the flange 3 and shoulder 4, each stem 6 is formed with an annular shoulder 12, the lower or under surface of which is beveled or inclined to correspond or co-act with the bevel or incline of the surface 4. To the unslotted end of each stem 6 is secured as by threading a head 13 between the under surface of which and a washer 14 surrounding the stem 6, and resting on the flange 3, is a coiled compression spring 15 adapted to normally maintain the outer surface of the cup or mold in contact with the surface 5 to maintain the mold sections in what may be termed "closed position."

It will be apparent that on pressure being applied to the head 13 that the stem 6 will be forced downwardly in the guide openings 1 and 1', and this movement will permit the separation of the outer surface of the cup or mold wall and the surface 5 of the guide opening, and will also cause the stem compression shoulder 12 to ride on the shoulder 4, which action causes an inward compression of the stem 6, as in Figure 6. The forcing together into meeting relation of the spaced side walls of the slots 7, as in Figure 6, during the downward longitudinal movement of the stem 6, causes a separation of the meeting edges 10 of the sections 11 and a consequent increase in size of the diameter of the discharge end of the mold or cup permitting the release of the molded article from the interior thereof by separating or removing the mold section surfaces therefrom. On pressure being released from the head 13, the spring 15 will reciprocate the stem 6 in an opposite direction within the guides in the plates 1 and 1' and cause a closing of the mold.

Referring to Figures 7 to 9 inclusive, I employ a construction similar to that illustrated in the remaining Figures except I eliminate the guide opening for each mold in the lower plate 1', and form the guide opening in the upper plate 1 with a tubular extension 5', and which carries on its lower end the inwardly beveled annular surface $5^2$ for co-operating with the beveled or tapering surface 11' of the mold or cup 9. In this modified construction, the extension 5' projects through an opening 16 in the plate 1', and said plates 1 and 1' are adjustable relative to each other by the rotation of adjusting screws 17. Thus it will be observed that the closer said plates 1 and 1' are moved, the greater will be the projection of the mold or cup 9 below the lower plate 1'. In this construction, I employ a shell 18 surrrounding each cup 9, and said shells are formed with co-operating semicircular sections 19, having beveled meeting vertical edges 20, and each provided with guide lugs or ears 21 radially extending from the upper ends thereof. The ears or lugs are formed with aligned openings through which are adapted to extend supporting rods 22, extending one longitudinally of each side edge of the lower plate 1', and said rods carry the spaced collars 23 and 23' between which are located the ears or lugs 21.

It will be observed from Figure 8 that the ears or lugs 21 normally lie in spaced relation and are forced together by coiled springs 24, one positioned intermediate one of said ears 21 and one of the collars 23 at opposite sides of the shell.

In this modified form of construction, the head 13 carries at diametrically opposite sides a downwardly disposed wedge shaped shell section separator 25, the lower ends of which are adapted for normally extending between the adjacent surfaces of the lugs or ears 21, and on the downward movement of the stem 6 are adapted to move between the lugs or ears 21 and separate the shell sections simultaneously with the separation of the mold or cup sections affording the ready release and discharge of the molded confection therefrom. It will be observed that the movement of the plate 1 to and from the plate 1' will vary the normal position of the mold or cup 9 within the shell 18, and thereby vary the size of the confection molded within said shell.

Having thus described my invention what I claim as new and desire to secure by Letters Patent of the United States is:—

1. A mold for the described purpose, comprising a base formed with a guide opening therethrough having inwardly tapering walls at its opposite ends, a tubular stem extending through and longitudinally movable within said opening and at its lower end carrying a mold cup formed with a wall surface tapered to correspond to the wall at one end of said opening, said stem and cup being longitudinally slotted providing permanently associated separable mold cup portions, a stem compressing shoulder carried by the stem adjacent its opposite end for riding on the other tapered end of said guide opening, and a head on said stem whereby on longitudinal inward movement being imparted thereto said stem compressing shoulder will engage its surface compressing said stem and releasing said cup wall from its engaging surface causing a spreading or separating of the cup forming portions thereof.

2. An expansible mold, comprising a cupped mold member consisting of a plurality of co-operating sections permanently associated together, a stem mounting said sections, a guide within which said stem is longitudinally movable, and means associated with said stem and guide for causing a separation of said mold sections on longitudinal movement being imparted to said stem in one direction.

3. An expansible mold comprising a cupped mold member consisting of a plurality of co-operating sections permanently associated together, a stem mounting said mold and divided longitudinally for a portion of its length into a plurality of sections arranged with their adjacent walls in co-operating spaced relation and each carrying one of said mold sections at its lower end, a guide within which said stem is mounted for longitudinal movement, and means associated with said stem and guide for causing a separation of said mold sections on longitudinal movement in one direction being imparted to said stem.

4. An expansible mold, comprising a cupped mold member divided radially into a plurality of co-operating sections permanently associated together, a support for each section disposed in spaced parallel relation and united at one end, a guide within which said supports are mounted for longitudinal movement, a coiled spring associated with said supports for maintaining the same at one end of their movement in said guide and the meeting edges of said mold sections in contact, and means for forcing said supports together on movement being imparted thereto against the action of said spring for separating said mold sections.

5. An expansible mold, comprising a tubular guide formed at its opposite ends with opposing inwardly beveled guide walls, a cupped mold member having a beveled outer wall and divided radially into a plurality of permanently associated co-operating sections formed with parallel co-operating walls, a plurality of parallel supports, one mounting each section, said supports connected at one end, and within their length lying in spaced relation, a beveled shoulder associated with each support and disposed to form a broken ring surrounding the same, said shoulders and said beveled mold side wall adapted for co-operation with the beveled guide walls at opposite ends of said guide, a spring for maintaining said supports in normal position at one end of their movement in said guide with the mold sections in meeting relation, said shoulders adapted on movement of said supports from normal position to ride on one of said beveled guide walls and force said supports together whereby the lower portions of said mold section walls are separated from each other.

6. An expansible mold, comprising a tubular guide, a cupped mold consisting of a plurality of co-operating mold sections adapted to normally lie with said walls in full meeting relation, a tubular stem of spring material mounted for longitudinal movement in said guide and inwardly slotted from one end to provide a plurality of spaced supports each mounting at one end one of said mold sections, a seat for the outer face of said mold, means for normally maintaining the said mold surface in contact with said seat to retain said mold sections in co-operating close position, and means adapted on the longitudinal movement of said stem in one direction for partly releasing the contact of said mold surface with said seat and for reducing the diameter of said stem by pressing said supports inwardly whereby the lower ends of said mold sections will be separated from each other.

7. A mold comprising a cupped mold portion consisting of a plurality of co-operating mold sections, a stem mounting the same, a guide within which said stem reciprocates, an open ended shell snugly surrounding said cupped mold portion and within which the same moves on the reciprocation of said stem, and means for expanding said shell and separating said mold sections on the reciprocation of said stem in one direction.

8. A mold comprising a cupped mold portion consisting of a plurality of co-operating mold sections, a stem mounting the same, a guide within which said stem reciprocates, an open ended shell snugly surrounding said cupped mold portion and within which the same moves on the reciprocation of said stem, means for expanding said shell and separating said mold sections on the reciprocation of said stem in one direction, and means for contracting said shell and mold sections on the reciprocation of said stem in a reverse direction.

9. A mold comprising a cupped mold portion consisting of a plurality of co-operating mold sections, a stem mounting the same, a guide within which said stem reciprocates, an open ended sectional shell snugly surrounding said cupped mold portion, a support for said shell, means for adjusting the shell and mold portion to vary the normal capacity of the shell, and means for expanding said shell and mold portions on the reciprocation of said stem in one direction to release the material held thereby.

10. A mold consisting of a tubular shell open at its ends and divided longitudinally into sections, a closure for the upper end of the shell, a support for the closure, and means for adjusting the closure within the shell to vary the capacity thereof.

11. A mold consisting of a tubular shell open at its opposite ends and divided longitudinally into sections, a sectional closure for the upper end of the shell, a support for the closure, means for moving the closure vertically within the shell to vary the capacity thereof, and means for expanding the shell and closure for releasing the material contained therein.

In testimony whereof I have signed my name to this specification.

CLIFFORD P. SPECK.